Figure 1:
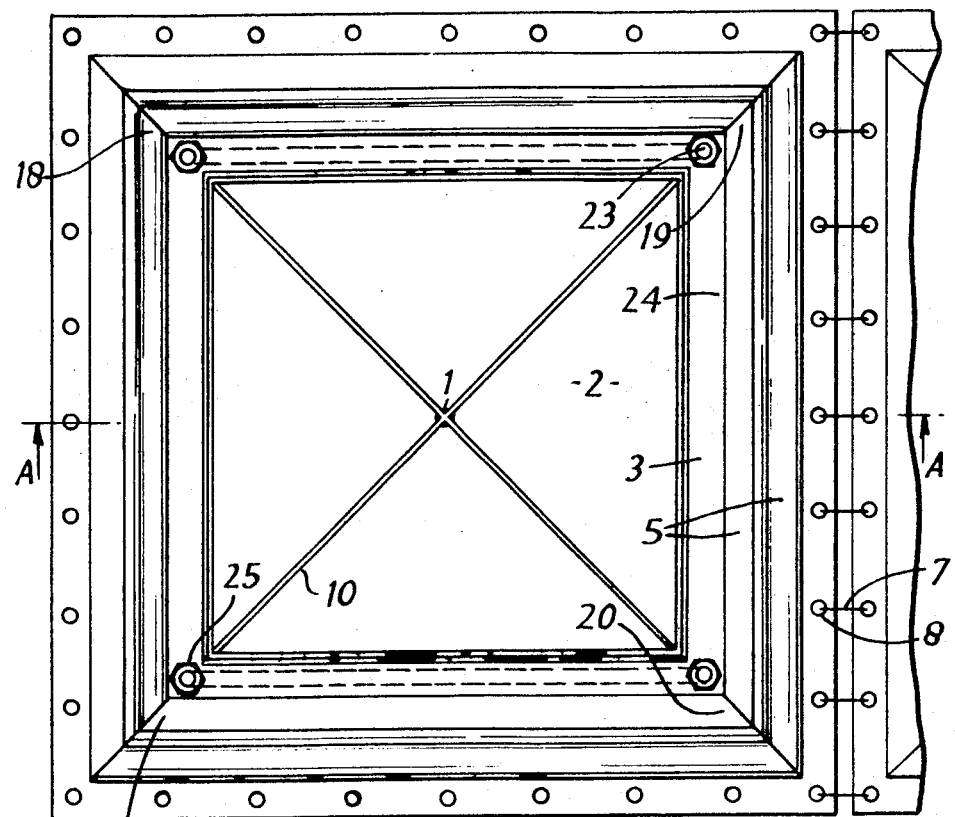

United States Patent [19]
Dobell

[11] 3,730,120
[45] May 1, 1973

[54] METHOD AND APPARATUS OF COLLECTING RAINWATER

[75] Inventor: Curzon Dobell, Nassau, Bahamas

[73] Assignee: Aquavoir Holding Company S.A., Panama, Panama

[22] Filed: Mar. 1, 1971

[21] Appl. No.: 119,884

Related U.S. Application Data

[63] Continuation-in-part of Ser. No. 827,191, May 23, 1969, abandoned.

[52] U.S. Cl. .............................................. 114/0.5 R
[51] Int. Cl. ............................................ B63b 35/00
[58] Field of Search ................................. 9/11, 11 A; 114/0.5 R, 0.5 T

[56] References Cited

UNITED STATES PATENTS 3,092,854   6/1963   Manhart .................................. 9/11 A

FOREIGN PATENTS OR APPLICATIONS 734,139   7/1955   Great Britain .......................... 9/11 A Primary Examiner—Trygve M. Blix
Attorney—Wenderoth, Lind & Ponack

[57] ABSTRACT

Use is made of the superficial area occupied by salt water lakes and lagoons for the collection of rain water by employing a floating collecting container, which is enclosed by a deck, on to which rain falls and from which it drains into the collecting container below. The aperture or apertures in the deck is preferably provided with a simple non-return valve to reduce vapor loss and the whole apparatus is preferably composed of thin, flexible plastics sheet.

4 Claims, 4 Drawing Figures

CURZON DOBELL, Inventor

By Wenderoth, Lind & Ponack,
Attorneys

METHOD AND APPARATUS OF COLLECTING RAINWATER

This is a continuation of application Ser. No. 827,191, filed May 23, 1969, now abandoned.

The present invention relates to a method and apparatus for collection of rainwater.

In many tropical areas, in particular coastal areas and islands, severe water shortage is experienced at certain seasons of the year, although at certain other times of year there may be substantial local rainfall, which if collected could be used to augment supplies at other times of the year. However, it is necessary to provide large catchment areas for this purpose and it is desirable not to sterilize otherwise usable land by employing it as a catchment area. The principal object of this invention is therefore to use, for rain catchment purposes, such areas as beaches, salt marshes, tidal lagoons and sheltered sea coves and bays, which are permanently or periodically covered by water.

In tropical areas it is necessary to protect the surface of collected rainwater to prevent rapid evaporation loss and accordingly the present invention provides a method of collecting rainwater in which it is collected on a catchment surface and is run into a collecting vessel at a level beneath the catchment surface, means being provided for floating the catchment surface and collecting vessel. In this arrangement the contents of the collection vessel are protected from excessive evaporation by the catchment surface and the method may be carried out at catchment areas which are either permanently water-covered (i.e., bays and swamps) or alternately water-covered and dry (i.e., tidal lagoons) or indeed areas which are water-covered only at certain periods of the year.

In carrying this invention into effect the apparatus employed comprises a floating structure for gathering and storing rainwater. Preferably the apparatus is constructed in a readily transportable form and is built up from separate units of convenient size using plastic material. The individual units are constructed so that one unit can be readily joined to one or more additional units to provide a catchment area of any desired size by merely joining the required number of units.

The individual units preferably each comprise a deck which slopes inwardly to one or more orifices, preferably a single orifice arranged centrally of the deck, the orifice preferably being provided with a simple form of non-return valve so that the weight of collected water opens the valve and allows the water to run through into a collecting vessel beneath; whilst the orifice remains closed at other times to minimize the loss of water by evaporation. Whilst the deck is preferably rectangular for convenience in joining it to the deck of neighboring units and so that the combined collecting area provided by the decks of a large number of connected units is as large as possible in relation to the superficial area occupied by the units, the shape of the underlying collecting vessel may be the same as that of the deck or of some other shape, such as circular. The collecting vessel may be constructed so as to be inherently buoyant or a separate buoyancy means may be provided, either connected to the collecting vessel or to the deck.

Where the units are to be used in any area which may dry out periodically, the units are preferably provided with supporting legs on which they may rest so as to avoid the collecting vessel, preferably formed of light gauge plastic sheet, from coming into contact with the earth.

Whilst the deck may be made rigid, it can be made of flexible sheet material and in such case it is only necessary that the deck should be constructed in such a way that collected water will gather in the area of the orifice and run through under its own weight, i.e., it is only necessary that the deck should assume a sloping condition under the weight of a small quantity of water.

The deck is preferably formed of material providing a heat-reflective surface, so as to minimize heat transfer to the interior of the collecting vessel and to have a low heat content. The distance from any point on the deck to an orifice is also preferably arranged to be quite small. The purpose of these two measures is to minimize the evaporation loss, which can be large in relation to total rainfall where large concrete areas are provided on hillsides for catchment purposes. The deck is also preferably thermally insulating to minimize pressure changes within the vessel through changes in internal temperature.

The collecting vessel in each case is preferably provided with two outlet connections in the lower part of the vessel. This permits an array of units to be connected together to permit collected water to be pumped out by a single pump.

Figure 2:
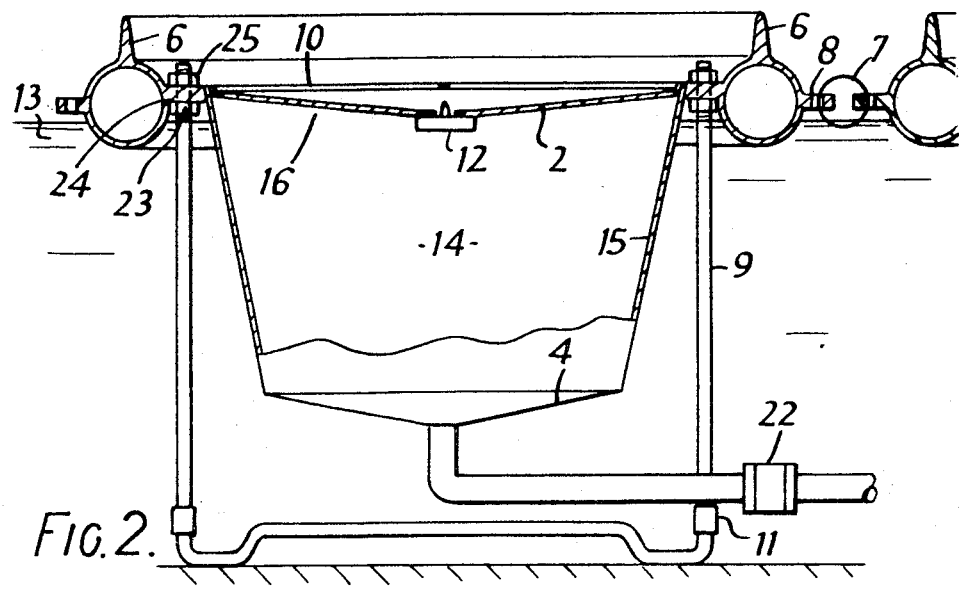
Figure 3:
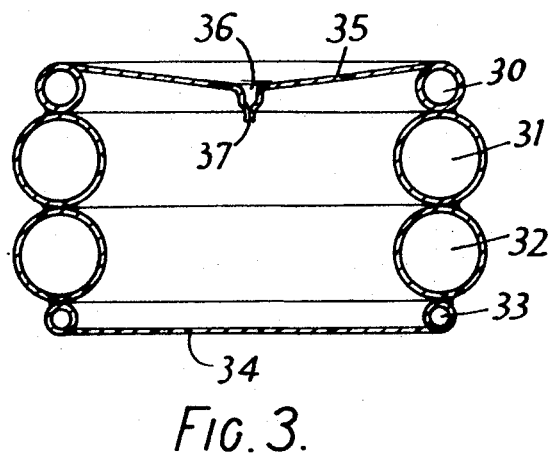
Figure 4:
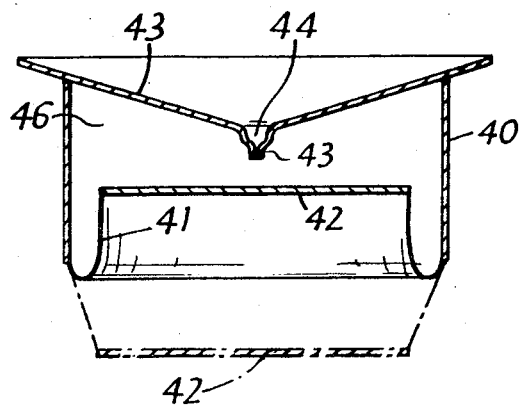

Referring now to the accompanying drawings:

FIG. 1 is a plan view showing a particular embodiment of the present invention having a square shape although other shapes can be used as the shape of the structure is not of great significance to its function, FIG. 2 is a sectional elevation of the present invention taken along section A—A shown in FIG. 1, FIG. 3 is a section of a modified form of the present invention, and FIG. 4 is a section of a further modified form.

Referring to FIGS. 1 and 2 of the drawings a collecting vessel 14 is formed of thin flexible plastic sheet material and may be of any desired dimension or shape, has a deck 2 with a suitable slope draining to an opening 1, through which rainwater, falling on the surface 2 of the deck, drains into the vessel 14. The vessel 14 is provided with a side wall 15 and a bottom to complete a fully enclosed container except for holes for the entry and withdrawal of liquid therein contained. A detachable flotation collar 5 is provided around the periphery of the vessel. The collar 5 is turn is provided with a barrier 6 of sufficient height to prevent waves from breaking over the top of the buoyancy collar and on to the deck 2.

An auxiliary detachable frame 9, jointed by any suitable means 11 may be provided to support the vessel 14 to prevent it coming to rest on the bottom of a pond or lagoon after the water in which it is floated has receded or should it be desired to utilize the vessel on dry land. Such supports 9 may be placed diagonally between the points 17 and 19, and 18 and 20 respectively or along the line connecting the points 18 and 19 and 17 and 20 and/or 19–20 and 18–17 (see FIG. 1).

In order to prevent the vessel from collapsing inwards as it fills with liquid, additional struts 10 follow the direction of supporting members 9 to hold the uppermost parts thereof at a predetermined spacing.

Each vessel is fitted for attachment to one or more receptacles around its periphery. In the drawings the means provided for this purpose is shown as a surrounding tongue on the flotation collar 5. Grommets 8 are placed at suitable intervals in this tongue so that each unit may be joined to other units by connectors 7.

When the apparatus is to act as a floating unit the buoyancy collar 5 with the wave barrier 6 is attached along line 24 to the collecting vessel by suitable means such as zippers or lacing through grommets. When the collecting vessel is to be used on dry land the buoyancy collar 5 is removed and the supporting frame 9 is placed through grommets 23 at points suitably spaced around the tongue 3 having a flange 24 larger than the grommet below with a nut, clamp or other suitable fixture 25 above the grommet to support the collecting vessel around its upper periphery.

Stiffening members 10 to maintain the shape of the upper surface of the receptacle may be required for both the floating and ground conditions.

The vessel 14 is provided with an outlet pipe 21 which is connected by a sleeve 22 to a common outlet for a number of units from which the contained liquid may be withdrawn by pumping or by the application of compressed air to the interior of any one or more receptacles. Alternatively the vessel may be provided with a pair of outlet pipes, so that the collecting vessels of an array of units may be connected up in series.

As shown in FIG. 2, a flap 12 is positioned beneath the hole 1 and is hinged on one side and spring-loaded to remain closed except when there is sufficient liquid above the flap to open it sufficiently for the liquid to drain into the collecting vessel 14. This flap 12 is designed with sufficient strength to seal the container when it is emptied by the introduction of compressed air.

The upper surface of the deck 2 is preferably provided with a white exterior surface to reflect heat and may be provided with additional layer of insulation 16 to minimize the heating of the contained liquid and thus minimize evaporation losses and pressure build-up.

It is intended that the apparatus of this invention may be employed as a floating structure carried by a supporting buoyancy collar or as a structure which may alternately float or rest on the bottom on supporting members 9: if the water level recedes. Both the buoyancy collar 5 and the supporting members 9 are detachable and may be used together or interchangeable. It should also be understood that it is the intention that a large number of units as described be joined together to cover large areas of water ponds or marshes subject to tidal oscillations or periodic flooding.

It should also be understood that it is the intention of the invention that similar units may be supported on dry land around their supper periphery by support 9 and with each unit on a relatively flat surface but if the contour of the land demands rows of units can be stepped down in successive terraces with the drainage flowing towards the storage units at the lower level under controlled conditions by providing valves at the junction 22 of the drainage pipe connecting different levels of containment units.

The use of a non-return valve at each orifice is a special feature of the present invention in that it greatly reduces the loss of collected water in tropical and subtropical territories where the apparatus of the present invention finds its principal utilization. When the deck is formed of thin flexible plastic sheet material, the deck rises when exposed to strong sunlight and assumes a convex condition, but it is found that as soon as the rain starts to fall, the cooling effect of the rain leads to almost immediate fall of the deck to a position in which water is collected around the orifice or orifices.

The apparatus of FIG. 3 is a very simple unit made from thin flexible plastic sheet and comprises a series of inflatable rings 30, 31, 32, 33, secured to each other and carrying a floor 34 and a deck 35, each formed of a single thickness of plastic sheet. The deck 35 is provided with an orifice 36, which is normally retained in the closed condition by a non-return valve 37 of any simple type. In this case the rings 30–33 could be replaced by a single ring of larger volume when in the inflated condition.

A further type of unit is illustrated in FIG. 4. This comprises a ring 40, which is substantially rigid in the vertical direction, connected by a flexible side wall 41 to a bottom plate 42, which can move between the upper and lower positions indicated. A rigid deck 43 is connected to the ring 40 and is provided with a central orifice 44, having a non-return valve 45. Owing to the fact that the collected rainwater and the unit is floated in salt water, adequate buoyancy is provided by the air entrapped in the space 46 under the deck.

In the construction of FIG. 4, the deck 43 is preferably moulded from a rigid plastic material, preferably a cellular plastic to provide good thermal insulation. The deck is preferably square for ease of connection to other units and is provided with means, such as those shown at 7,8 in FIG. 2, for attachment to other like units. The overhang of the deck provides an effective wave barrier.

Both the constructions of FIGS. 3 and 4 may be provided with supporting frameworks, as in the case of FIGS. 1 and 2. Furthermore the collecting space may be provided with one or more outlet pipes for interconnection with other units.

What is claimed is:

1. A unit for collecting rainwater comprising a collecting vessel, a deck covering substantially the whole superficial area occurpied by the vessel and closing the mouth thereof and a buoyancy means for supporting said collecting vessel and deck, the surface of the deck sloping inwardly to at least one orifice through which rainwater falling on the deck may enter the vessel, and the wall of the collecting vessel below said deck being free from openings to atmosphere, the whole of said wall of the collecting vessel below said deck being impermeable to the passage of water, whereby substantially the whole volume enclosed by the collecting vessel and deck are available for collection of rainwater, each orifice in said deck having a non-return valve openable by the pressure of the overlying rainwater to allow passage thereof into the collecting vessel, said valve being normally closed to prevent emission of water vapor and thus minimize evaporation loss of water collected in the vessel.

2. A unit according to claim 1, wherein said collecting vessel is formed of thin flexible plastic material, said orifice is provided with a non-return valve, and said buoyancy means comprises a buoyancy collar arranged around the upper edge of the collecting vessel adjacent the deck to buoyantly support the unit.

3. A unit according to claim 1 comprising at least one inflatable ring forming the side wall of said collecting vessel, a thin plastic sheet connected to the lower end of said ring forming the floor of said collecting vessel and a thin plastic sheet connected to the top end of the ring, forming said deck, said deck sloping inwardly to an orifice provided with a non-return valve.

4. A unit for collecting rainwater comprising a collecting vessel, a deck covering substantially the whole superficial area occupied by the vessel and closing the mouth thereof, a buoyancy means for supporting said collecting vessel and deck, and a supporting framework adapted to contact the ground and maintain the bottom of said collecting vessel out of contact with the ground when not supported buoyantly, the surface of the deck sloping inwardly to at least one orifice through which rainwater falling on the deck may enter the vessel, and the wall of the collecting vessel below said deck being free from openings to atmosphere, the whole of said wall of the collecting vessel below said deck being impermeable to the passage of water, whereby substantially the whole volume enclosed by the collecting vessel and deck are available for collection of rainwater.

* * * * *